United States Patent
Fujii et al.

(10) Patent No.: US 8,537,847 B2
(45) Date of Patent: Sep. 17, 2013

(54) DIGITAL CLOCK WITH INTERNET CONNECTIVITY AND MULTIPLE RESTING ORIENTATIONS

(75) Inventors: Hiroya Fujii, Tokyo (JP); Isamu Arie, Santa Monica, CA (US); Ronald Clark, Santa Monica, CA (US); Justin Randolf Jakobson, Venice, CA (US); Yuji Oikawa, Marina Del Ray, CA (US); Joe Wada, Tokyo (JP); Rui Yamagami, San Diego, CA (US); Takuo Ikeda, San Diego, CA (US); Chia-Yao Lin, Tokyo (JP); Junghee Yeo, L. A., CA (US)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 12/820,458

(22) Filed: Jun. 22, 2010

(65) Prior Publication Data

US 2011/0310705 A1 Dec. 22, 2011

(51) Int. Cl.
*H04L 12/56* (2011.01)
*H04J 1/16* (2006.01)

(52) U.S. Cl.
USPC ............ 370/419; 370/252; 370/329; 370/386

(58) Field of Classification Search
USPC .................................. 370/252, 329, 386, 419
See application file for complete search history.

(56) References Cited

U.S. PATENT DOCUMENTS

| | | | |
|---|---|---|---|
| 7,420,510 B2 | 9/2008 | Kolavennu et al. | |
| 2002/0194075 A1* | 12/2002 | O'Hagan et al. | 705/21 |
| 2005/0059406 A1 | 3/2005 | Thomson et al. | |
| 2008/0182584 A1 | 7/2008 | Le | |
| 2008/0211778 A1 | 9/2008 | Ording et al. | |
| 2009/0174680 A1 | 7/2009 | Anzures et al. | |
| 2011/0013759 A1* | 1/2011 | Binder | 379/93.17 |

OTHER PUBLICATIONS

James R. Milne, Kirstin Connors, Tisha Yasuhara, "Accelerometer-Basted Tapping User Interface" co-pending applicatin U.S. Appl. No. 12/705,106, filed Feb. 12, 2010.
James R. Milne, Kirstin Connors, Trisha Yasuhara, "Accelerometer-Basted Touchscreen User Interface" co-pending application U.S. Appl. No. 12/698,507, filed Feb. 2, 2010.
James R. Milne, Kirstin Connors, Trisha Yasuhara, "Accelerometer-Based CE Device Wireless Access Point Mapping" co-pending U.S. Appl. No. 12/705,173, filed Feb. 12, 2010.
Paul Jin Hwang, Fredrik Carpio, Nikolaos Georgis Benjamin Lo "GPS-based CE Device Wireless Access Point Mapping" co-pending application U.S. Appl. No. 12/71,525, filed Mar. 2, 2010.
A.R. Sandeep, Y. Shireyas, Shivam Seth, Rajat Agarwal, G. Sadashivappa, "Wireless Network Visualization and Indoor Empirical Propagation Model for a Campus Wi-Fi Network", http://www.waset.org/journals.waset/v42/v42-135.pdf. 2008.

(Continued)

*Primary Examiner* — John Pezzlo
(74) *Attorney, Agent, or Firm* — John L. Rogitz

(57) ABSTRACT

A wedge-shaped digital clock wirelessly receives weather, traffic, and other information over the Internet for display along with the time of day. The clock is wedge-shaped so that it can rest in two orientations, one with the display tilted back slightly from vertical and one with the display substantially horizontal. An accelerometer can signal the orientation to an internal processor, which can flip the text on the display as appropriate for the user flipping or turning the housing upside down, for example.

19 Claims, 3 Drawing Sheets

(56) References Cited

OTHER PUBLICATIONS

Jungan Wang, Bin Xie, Kan Cai, Agrawal D.P.: "Efficient Mesh Router Placement in Wireless Mesh Networks" http://ieeexplore.ieee.org/xpl/freeabs_all.jsp?arnumber=4428616, 2007.

S. Kouhbor, Julien Ugon, Alex Kruger, Alex Rubinov—University of Ballarat, "Optimal Placement of Access Point in WLAM Based on a New Algorithm", http://www/computer.org/portal/web/csdl/doi/10.1109/CMB.2005.75, 2005.

Leslie A. Lenert, Douglas A. Plamer, Theodore C. Chan, Ramesh Rao; "An Intelligent 802.11 Triage for Medical Response to Disasters", http///www.ncbi.nlm.nih.gov/pmc/articles/PMC1560742/ 2005.

Silver PAC, "Silver PAC Evolution 5500 Remote Would Have Been Great 3 Years Ago", Dec. 14, 2009; http://gizmodo.com/5426322/silver-pac-evolution-5500-remote-would-have-been-grat-3-years-ago.

"The chumby one—a new faster; cheaper chumby", Nov. 16, 2009; http://www.krunker.com/2009/11/16/the-chumby-one-a-new-faster-cheaper-chumby/.

RADIONOW, "Intergrated DAB, wi-fi, Twitter and Facebook? It makes Pure Sensia", Sep. 21, 2009; http://www.radio-now.com.uk/pure-sensia-wifi-dab-radio.htm.

Kristofer Brozio, "Sungale ID800WT 8 Inch Wi-Fi Digital Touchscreen Photo Frame", Jun. 30, 2009; http://www.testfreaks.com/blog/reviews/sungale-id800wt-8-inch-wi-fi-digital-touchscreen-photo-frame/.

Axiss Technology Corporation, Taiwan, "WiFi Digital Photo Frame", http://tsyannawu.trustpass.alibaba.com/product/104940461-101256632/8_Inch_Photo_Frame.html, At least as early as Dec. 16, 2009.

\* cited by examiner

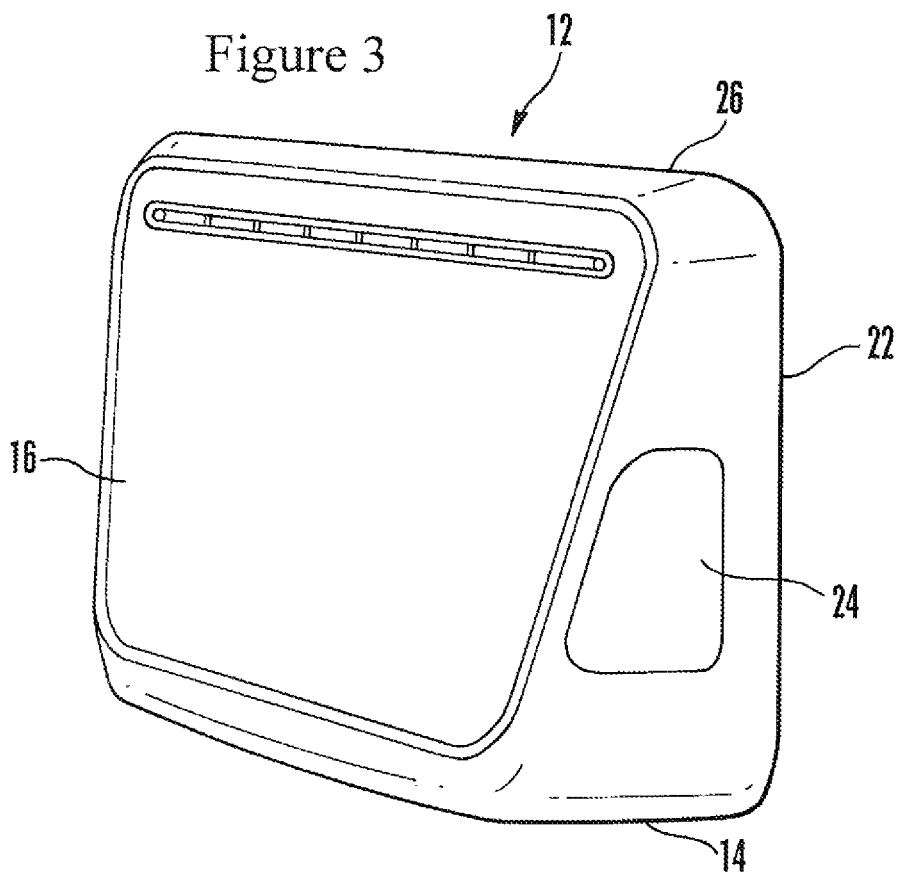
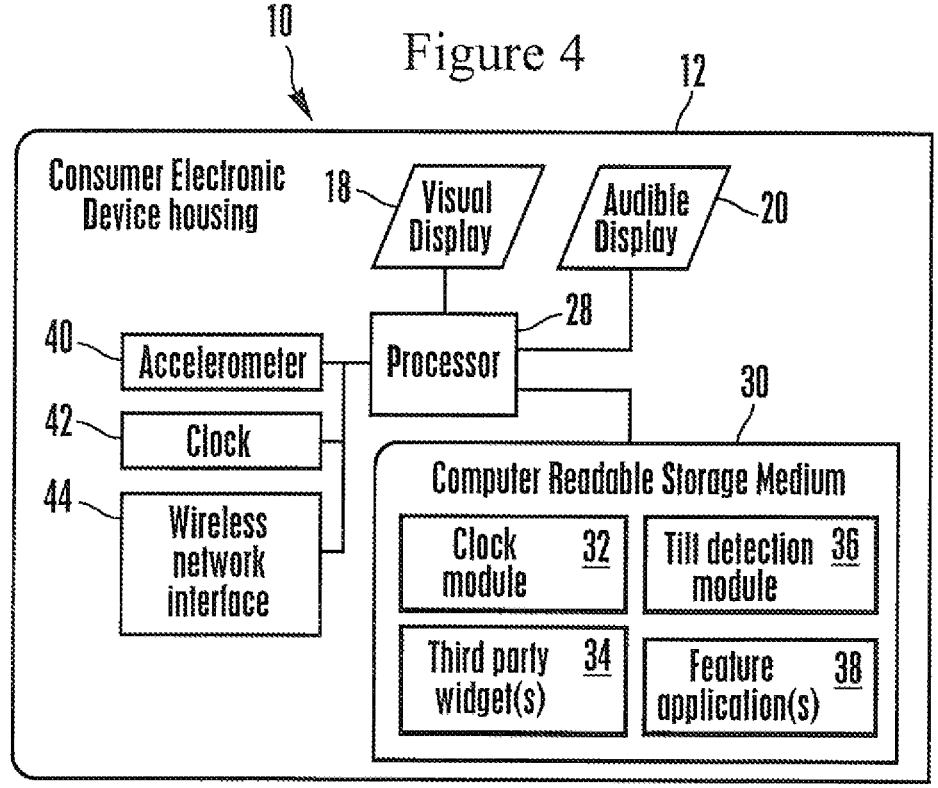

DIGITAL CLOCK WITH INTERNET CONNECTIVITY AND MULTIPLE RESTING ORIENTATIONS

I. FIELD OF THE INVENTION

The present application is directed to digital clocks with Internet connectivity and multiple resting orientations.

II. BACKGROUND OF THE INVENTION

A wide variety of CE devices such as wireless telephones, digital clocks, etc. leverage digital processing to provide a multiplicity of useful features to users. The present application understands that such devices may be further enhanced by incorporating accelerometer principles and by being configured with a convenient and useful wedge shape.

SUMMARY OF THE INVENTION

Accordingly, a consumer electronics (CE) device includes a wedge-shaped housing having a bottom surface and a back surface larger than the bottom surface. A processor is in the housing and a display is on the housing opposite to the back surface. The processor causes the time of day to be presented on the display. A network interface communicates with a wide area computer network and with the processor to enable the processor to present information from the network including weather and traffic information on the display. Also, an accelerometer can be the housing to send an orientation signal to the processor. The processor reorients information on the display according to the orientation signal. The housing can be moved by a person between a vertical orientation, in which the display is tilted back slightly from vertical, and a horizontal orientation, in which the display is oriented substantially horizontally.

In example embodiments the bottom surface and back surface are oriented obliquely to each other so that in the vertical orientation, the display is slightly canted back from true planar vertical to facilitate easier viewing. The display can be a touch screen and the network interface can be a Wi-Fi interface.

If desired, a speaker can be provided on the housing and can be controlled by the processor. In specific non-limiting examples the speaker is embedded in the bottom surface. The housing may be wider at the bottom surface and tapers inwardly toward an opposite top surface.

The processor can access one or more widgets executable by the processor according to control of the widget. The accelerometer may be located near a corner of the housing distanced from the geometric center of the housing, so that it can better sense tilting of the housing.

In another aspect, a digital clock includes a wedge-shaped housing tapering inwardly from a bottom surface to a top. A back surface of the housing is larger than the bottom surface. A visual display is on the housing opposite to the back surface, and a processor in the housing controls the visual display. A network interface is on the housing for coupling the processor to the Internet such that at least weather and traffic information from the Internet is presented on the display by the processor along with a time of day.

In another aspect, a method includes orienting a digital clock in a first orientation in which a visual display of the clock is canted slightly back from true vertical, and then resting the clock on a surface in the first orientation. The method further includes orienting the clock in a second orientation in which the visual display is substantially horizontal, and resting the clock on a surface in the second orientation.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a perspective view of the rear of the CE device;

FIG. 4 is a block diagram of the internal components of the CE device;

DETAILED DESCRIPTION OF THE PREFERRED EMBODIMENT

Figure 1:
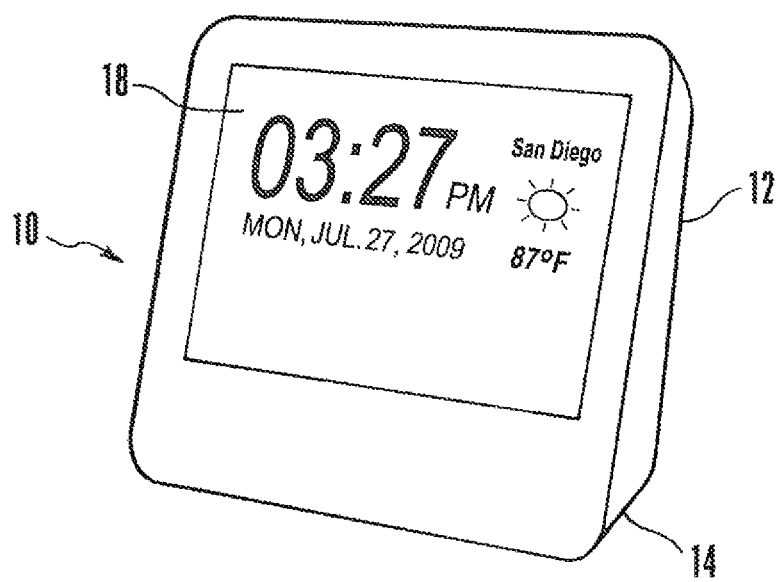
FIG. 1 is a perspective view of an example CE device in a vertical orientation.
Figure 2:
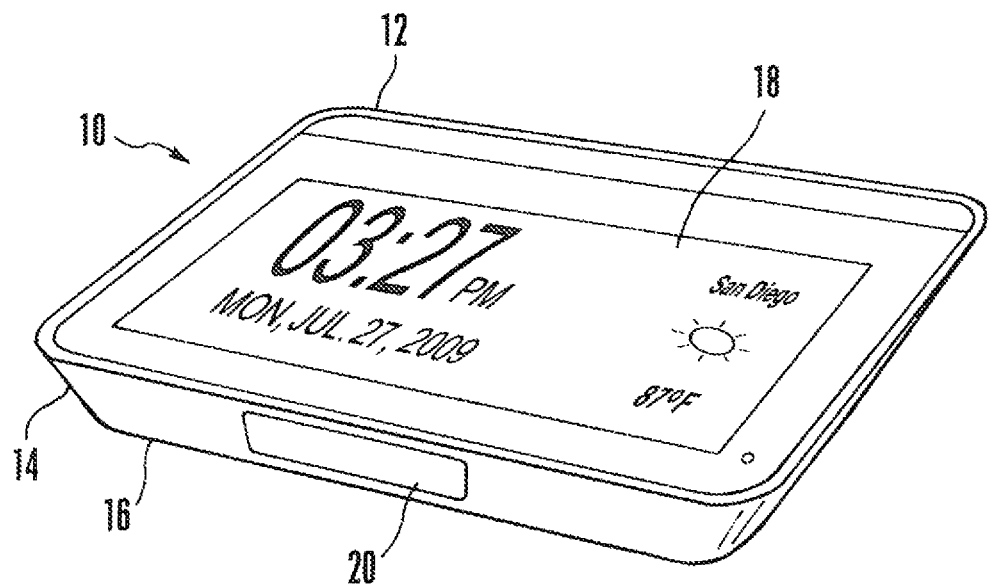
FIG. 2 is a perspective view of the CE device in a horizontal orientation.

Referring initially to FIGS. 1-3, a CE device 10 includes a portable lightweight plastic or metal housing 12. The housing is generally wedge-shaped as shown to allow use in a substantially vertical orientation (FIGS. 1 and 3), in which the housing rests on a relatively smaller bottom surface 14, and in a substantially horizontal orientation (FIG. 2), in which the housing rests on a relatively larger back surface 16. The bottom surface 14 and back surface 16 are oriented obliquely to each other so that in the vertical orientation, a visual display 18 such as a 7-inch touch screen on the housing 12 opposite the back surface 16 is slightly canted back from true planar vertical as shown to facilitate easier viewing. On the other hand, a person can flip the housing 12 to the horizontal orientation shown in FIG. 2 to facilitate visibility of the display 18 while the user is standing, e.g., while cooking in the kitchen, standing by a desktop, etc.

Additionally, stereo speakers 20 can be embedded in, e.g., the bottom surface 14 as shown in FIG. 2. Also, a cavity may be formed in a side surface 22 of the housing 12 (FIG. 3) that can be covered by a cover 24. It is to be understood that a universal serial bus (USB) connector can be in the cavity and can communicate with the below-described processor.

In describing the wedge shape, FIG. 3 perhaps best shows that the housing 12 is wider at the bottom surface 14 and tapers inwardly toward an opposite top surface 26.

Internal components of the CE device 10 may be seen in FIG. 4. The typically portable lightweight plastic housing 12 bears a digital processor 28. The processor 28 can control the visual display 18 and speakers 20. As mentioned above, the visual display 18 may be, e.g., a capacitive touchscreen display, although other display types may be used.

To undertake present principles, the processor 28 may access one or more computer readable storage media 30 such as but not limited to disk-based or solid state storage. In example non-limiting embodiments, the media 30 may store various software modules, including, for example, a clock module 32 for presenting a visual indication of time on the display 18, and one or more widgets 34 that may be provided by third parties and/or by the manufacturer of the CE device. By "widget" is meant a portable module of computer software, or application, that can be installed and executed within, for example, a HTML-based web page by an end user without requiring compilation. Widgets can take the form of on-screen tools (such as, e.g., clocks, event countdowns, auction-tickers, stock market tickers, flight arrival information, daily weather etc).

Additionally, the media 30 may store a tilt detection module 36 and one or more feature application(s) 38 such as an Internet browser for accessing an Internet-sourced weather forecast website, an Internet-sourced traffic information website, an Internet-sourced radio station, and an Internet-sourced TV website. Information from these sites may be presented on the displays of the device.

The housing 12 may hold an accelerometer assembly 40 which communicates acceleration signals to the processor 28 for purposes to be shortly disclosed. In one example, the accelerometer 40 is a MEMS-based accelerometer which outputs signals representing acceleration in each of the three spatial dimensions.

In one example, the accelerometer 40 is located near a corner of the housing 12, distanced from the geometric center of the housing, so that it can better sense tilting of the housing, which typically occurs about a central axis of the housing predominantly in two of the three dimensions, i.e., predominantly in the x and y dimensions, or the x and z dimensions, or the y and z dimensions Also, a computer clock 42 may also be provided to output a time of day signal to the processor 28 for display of the time on the visual display 18 and for, e.g., the sounding of a time-based alarm on the speakers 20. If desired, a wireless network interface 44 may be in the housing 12 and may communicate with the processor 28 to permit the processor 28 to communicate with a wide area computer network such as the Internet. The interface 44 may be, without limitation, a Wi-Fi interface.

Figure 5:
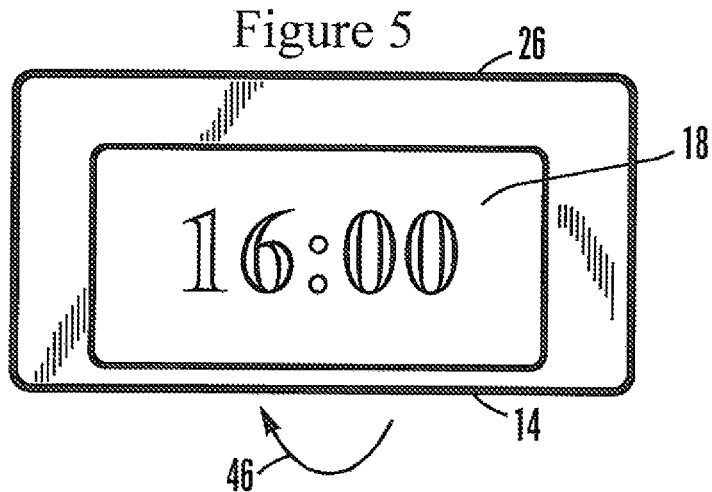
FIG. 5 is a screen shot of an example CE device in a first orientation showing a data display.
Figure 6:
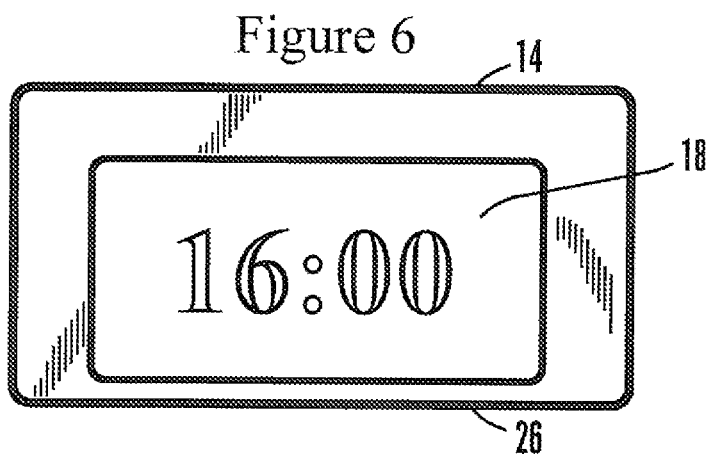
FIG. 6 is a screen shot of the CE device in FIG. 5 in a second orientation showing the data display.
Figure 7:
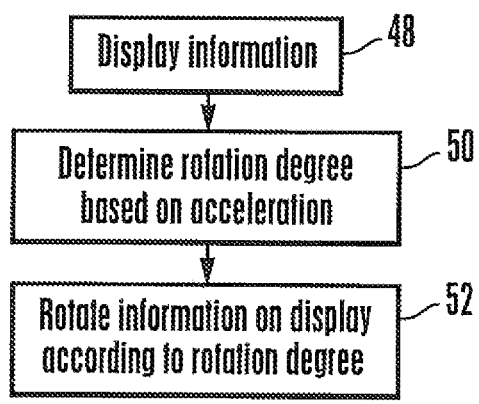
FIG. 7 is a flow chart of logic for rotating the data display in FIGS. 5 and 6.

Now referring to FIGS. 5-7, a readable presentation, in this example, the time of day, on the display 18 can be flipped as the CE device is turned so that the readable presentation always assumes a default orientation relative to the earth. For example, suppose the CE device is vended with the intention that, as described above, the surface 26 is the top of the housing and the surface 14 the bottom, as illustrated in FIG. 5. But if a person flips the housing over as indicated by the arrow 46 so that the bottom surface 14 is now on top (FIG. 6), present principles permit flipping the readable presentation as shown so that it continues to bear the default orientation with respect to the earth as shown.

Accordingly, at block 48 in FIG. 7 the readable information is presented on the display 18 in the default orientation, in this example, an orientation that assumes the housing is resting on the bottom surface 14. Moving to block 50, the processor 28 receives signals from the accelerometer 40 and, executing the tilt module 36, determines the number of degrees through which the CE device has been rotated based thereon. In the example shown, the CE device has been flipped 180 degrees, so at block 52 the processor rotates the readable information preferably by the same or approximately the same number of degrees the CE device has been flipped, e.g., 180 degrees. It is to be understood that present principles apply to, e.g., flipping the CE device 90 degrees from the assumed nominal orientation of FIG. 5.

The device may be updated with new or upgraded software downloaded from the Internet through the network interface.

While the particular DIGITAL CLOCK WITH INTERNET CONNECTIVITY AND MULTIPLE RESTING ORIENTATIONS is herein shown and described in detail, it is to be understood that the subject matter which is encompassed by the present invention is limited only by the claims.

What is claimed is:

1. Consumer electronics (CE) device comprising:
    wedge-shaped housing having a bottom surface and a back surface larger than the bottom surface;
    processor in the housing;
    display on the housing opposite to the back surface;
    the processor causing a time of day to be presented on the display;
    a network interface communicating with a wide area computer network and the processor to enable the processor to present information from the network including weather and traffic information on the display;
    an accelerometer in the housing and sending an orientation signal to the processor, the processor reorienting information on the display according to the orientation signal; wherein
    the housing can be moved by a person between a vertical orientation, in which the display is tilted back slightly from vertical, and a horizontal orientation, in which the display is oriented substantially horizontally.

2. The CE device of claim 1, wherein the bottom surface and back surface are oriented obliquely to each other so that in the vertical orientation, the display is slightly canted back from true planar vertical to facilitate easier viewing.

3. The CE device of claim 1, wherein the display is a touch screen.

4. The CE device of claim 1, further comprising a speaker on the housing and controlled by the processor.

5. The CE device of claim 4, wherein the speaker is embedded in the bottom surface.

6. The CE device of claim 1, wherein the housing is wider at the bottom surface and tapers inwardly toward an opposite top surface.

7. The CE device of claim 1, wherein the processor accesses one or more widgets executable by the processor according to control of the widget.

8. The CE device of claim 1, wherein the accelerometer is located near a corner of the housing distanced from the geometric center of the housing, so that it can better sense tilting of the housing.

9. The CE device of claim 1, wherein the network interface is a Wi-Fi interface.

10. Digital clock, comprising:
    a wedge-shaped housing tapering inwardly from a bottom surface to a top;
    a back surface of the housing being larger than the bottom surface;
    a visual display on the housing opposite to the back surface;
    a processor in the housing controlling the visual display; and
    a network interface on the housing coupling the processor to the Internet such that at least weather and traffic information from the Internet is presented on the display by the processor along with a time of day.

11. The clock of claim 10, wherein the back surface is oriented obliquely relative to the bottom surface.

12. The clock of claim 10, comprising an accelerometer in the housing and sending an orientation signal to the processor, the processor reorienting information on the display according to the orientation signal.

13. The clock of claim 10, wherein the housing can be moved by a person between a vertical orientation, in which the display is tilted back slightly from vertical, and a horizontal orientation, in which the display is oriented substantially horizontally.

14. The clock of claim 10, wherein the display is a touch screen.

15. The clock of claim 10, further comprising a speaker on the housing and controlled by the processor.

16. The clock of claim 15, wherein the speaker is embedded in the bottom surface.

17. The clock of claim 10, wherein the processor accesses one or more widgets executable by the processor according to control of the widget.

18. The clock of claim 10, wherein the accelerometer is located near a corner of the housing distanced from the geometric center of the housing, so that it can better sense tilting of the housing.

19. The clock of claim 10, wherein the network interface is a Wi-Fi interface.

* * * * *